United States Patent
Kulakov et al.

(10) Patent No.: US 8,526,954 B2
(45) Date of Patent: Sep. 3, 2013

(54) METHOD FOR ASSIGNING A UNIQUE IDENTIFIER TO A MOBILITY MANAGEMENT ENTITY AND FOR IMPLEMENTING A MOBILITY MANAGEMENT ENTITY IN A CORE NETWORK OF AN SAE/LTE COMMUNICATION SYSTEM AS WELL AS A MOBILITY MANAGEMENT ENTITY

(75) Inventors: Alexei Kulakov, Duesseldorf (DE); Yang Lu, Duesseldorf (DE); Peter Wild, Krefeld (DE)

(73) Assignee: Vodafone Holding GmbH, Duesseldorf (DE)

( * ) Notice: Subject to any disclaimer, the term of this patent is extended or adjusted under 35 U.S.C. 154(b) by 275 days.

(21) Appl. No.: 12/804,827

(22) Filed: Jul. 29, 2010

(65) Prior Publication Data
US 2011/0070914 A1 Mar. 24, 2011

(30) Foreign Application Priority Data
Jul. 30, 2009 (DE) .......................... 10 2009 035 366

(51) Int. Cl.
*H04W 88/02* (2009.01)
(52) U.S. Cl.
USPC ....................................................... 455/436
(58) Field of Classification Search
USPC ......................................... 455/436–444, 450
See application file for complete search history.

(56) References Cited

U.S. PATENT DOCUMENTS

| 8,144,696 B2* | 3/2012 | Kallio et al. ................... 370/352 |
| 8,200,220 B2* | 6/2012 | Guo et al. .................. 455/435.1 |
| 8,238,909 B2* | 8/2012 | Guo et al. .................. 455/435.1 |
| 2009/0046599 A1 | 2/2009 | Pollakowski et al. |
| 2010/0067405 A1* | 3/2010 | Kanazawa et al. ............ 370/254 |
| 2011/0090857 A1* | 4/2011 | Guo .............................. 370/329 |
| 2011/0261715 A1* | 10/2011 | Norefors et al. .............. 370/252 |
| 2012/0069737 A1* | 3/2012 | Vikberg et al. ............... 370/232 |

FOREIGN PATENT DOCUMENTS
WO WO 2010/003452 A1 1/2010

OTHER PUBLICATIONS

3GPP TS 23.003 V8.5.0, "3rd Generation Partnership Project; Technical Specification Group Core Network and Terminals; Numbering, addressing and identification (Release 8)," pp. 16-17, 3GPP Organizational Partners, Valbonne, France (Jun. 2009).
3GPP TS 23.401 V9.1.0, "3rd Generation Partnership Project; Technical Specification Group Services and System Aspects; General Packet Radio Service (GRPS) enhancements for Evolved Universal Terrestrial Radio Access Network (E-UTRAN) access (Release 9)," pp. 17-18, 3GPP Organizational Partners, Valbonne, France (Jun. 2009).

* cited by examiner

*Primary Examiner* — Diane Mizrahi
(74) *Attorney, Agent, or Firm* — Kriegsman & Kriegsman (57) ABSTRACT

The present invention relates to a method for assigning unique identifiers to a mobility management entity in a core network of an SAE/LTE communication system as well as a method for implementing a mobility management entity in a core network of an SAE/LTE communication system. Further, the invention relates to a mobility management entity of a core network of an SAE/LTE communication system.

19 Claims, 2 Drawing Sheets

METHOD FOR ASSIGNING A UNIQUE IDENTIFIER TO A MOBILITY MANAGEMENT ENTITY AND FOR IMPLEMENTING A MOBILITY MANAGEMENT ENTITY IN A CORE NETWORK OF AN SAE/LTE COMMUNICATION SYSTEM AS WELL AS A MOBILITY MANAGEMENT ENTITY

BACKGROUND OF THE INVENTION

The present invention relates to a method for assigning a unique identifier to a mobility management entity in a core network of an SAE/LTE communication system as well as a method for implementing a mobility management entity in a core network of an SAE/LTE communication system. Further, the invention relates to a mobility management entity of a core network of an SAE/LTE communication system.

The most recent developments show that in the field of mobile communication, it is desired to transmit ever increasing quantities of data. Existing mobile communication standards, such as, for example, GSM or UMTS in future will no longer be sufficient in order to transmit such quantities of data. The 3GPP consortium (3GPP=Third Generation Partnership Project) thus has set a target for the next generation of mobile communication systems, among other things, to increase the rate of data transmission, transmission times as well as transmission capacity. Such efforts are referred to as system architecture developments (SAE=System Architecture Evolution) and/or long-term development (LTE—Long Term Evolution). The previously existing landline communications will be completely replaced by packet communication with the new system architecture.

This type of SAE/LTE communication system comprises an access network or wireless network, the so-called Radio Access Network (RAN), as well as a core network, the so-called Core Network (CN). In this way, the new SAE/LTE communication system supports the simultaneous operation of different access networks. This means that the system architecture development makes possible, for example, the mobility, the handover, and the roaming among the different access networks. For example, this type of access network/wireless network can be the UTRAN (UTRAN=Universal Terrestrial Radio Access Network). The core network has functional units. A user level unit is defined for the user level and a control level unit is defined for the control level. The user level unit comprises two logic gateways, namely the so-called serving gateway and the packet data network gateway. The serving gateway terminates the interface to the access network/radio network (RAN). The packet data network gateway terminates the interface to the packet data network. For example, the packet data network gateway assigns an IP address to the user terminal. Part of the control level unit, for example, is the so-called mobility management entity (MME=Mobility Management Entity). A mobility management entity has different functions. Thus, e.g., signaling is processed for control purposes, for example, for mobility, by the mobility management entity. Thus, a mobility management entity, among other things, can be appropriate for control communications or signaling in connection with registering, localizing, authenticating and roaming. Further, a mobility management entity can be appropriate for distributing pager communications to the base stations of the access network/radio access network, the so-called eNBs or eNode Bs. These base stations of the access network/radio access network are connected to the mobility management entities via so-called S1 interfaces.

In this way, the S1 interfaces can be flexibly utilized in the SAE/LTE communication system That is, a base station (eNB) can be connected simultaneously to different mobility management entities via S1 interfaces. Each mobility management entity has a plurality of parameters and at least one unique identifier, to which values must be assigned in order to produce a connection to the base stations. At the present time, these parameters and the at least one unique identifier are assigned by a so-called configuration unit, in particular, by a planning tool or a configuration tool on a server, wherein a human interaction is necessary in the planning phase. That is, a network operator must assure that the identifiers assigned to the mobility management entities are uniquely assigned, i.e., each identifier is assigned only once within the core network of a network provider. This means a manual extra expense for the network operator. If, for example, a new mobility management entity is added to the core network, the network operator must assign a new unique identifier to this newly added mobility management entity by means of the configuration unit. This means an extra expense for the network operator. The same applies when a mobility management entity that already exists must be newly characterized.

SUMMARY OF THE INVENTION

The object of the invention is therefore to provide a method and a mobility management entity by means of which the assignment of unique identifiers to mobility management entities in a core network of an SAE/LTE communication system is simplified or by means of which the implementation of a mobility management entity that is newly added to a core network of an SAE/LTE communication system is simplified.

According to the invention, this object is accomplished by a first method for assigning a unique identifier to a mobility management entity in a core network of an SAE/LTE communication system with the features according to the independent patent claim 1, by a method for implementing a mobility management entity in a core network of an SAE/LTE communication system with the features according to the independent patent claim 16, as well as by a mobility management entity in a core network of an SAE/LTE communication system with the features according to the independent patent claim 17. Additional features and details of the invention can be taken from the subclaims, the description and the drawings. Here, features and details that are described in connection with the method according to the invention according to patent claim 1 are valid, of course, also in connection with the method according to the invention according to patent claim 16, as well as the mobility management entity according to the invention according to patent claim 17, and vice versa, so that relative to the disclosure, reference is always made interchangeably to the individual aspects of the invention.

According to the first aspect of the invention, the object is accomplished by a method for assigning a unique identifier to a mobility management entity in a core network of an SAE/LTE communication system, wherein the method is characterized by the following steps:

a1) Providing at least one first identifier to a mobility management entity, b1) Transmitting the at least one first identifier from the mobility management entity to a selection of other mobility management entities, and/or transmitting other assigned identifiers from the selection of other mobility management entities to the mobility management entity, c1) Comparing the other identifiers with the at least one first identifier in order to establish the uniqueness of the at least one first identifier,
d1) Assigning the at least one first identifier to the mobility management entity, in order to establish the uniqueness of the at least one first identifier.

In a first step, the mobility management entity receives at least one first identifier. This at least one first identifier is transmitted from the mobility management entity to a selection of other mobility management entities. Alternatively or additionally, the other mobility management entities can transfer their respective identifiers to the mobility management entity. Subsequently, a comparison of the other identifiers of the other mobility management entities with the at least one first identifier of the mobility management entity is made, in order to establish the uniqueness of the at least one first identifier. That is, an examination is made of whether the at least one first identifier that has been provided to the mobility management entity already characterizes another mobility management entity. If the uniqueness of the at least one first identifier is established, the at least one first identifier is assigned to the mobility management entity.

The mobility management entity is part of the core network of the SAE/LTE communication system, i.e., it is implemented in the core network of the SAE/LTE communication system.

That is, after establishing that the at least one first identifier is not assigned to any other mobility management entity, the at least one first identifier is assigned to the mobility management entity. In this case, the mobility management entity can assign the first identifier advantageously to itself. That is, only after checking that the at least one first identifier does not already characterize another mobility management entity in the core network, does the mobility management entity assign to itself the at least one first identifier, so that the mobility management entity is uniquely and unmistakably characterized within the core network.

One advantage of this method is that the mobility management entity to which a unique identifier will be assigned need only be provided at least one first identifier.

The examination of whether this at least one first identifier that is provided is already assigned to another mobility management entity within the core network is performed automatically and independently by the mobility management entity or by an interaction of the mobility management entity with the other mobility management entities. In establishing that the at least one first identifier that is provided has not been assigned to another mobility management entity, the mobility management entity assigns to itself the first, i.e., the unique identifier. In the case that the at least one first identifier that is provided is already assigned to another mobility management entity, other first identifiers can be transmitted and compared.

This method assures, in a simple manner and way, that a unique identifier is assigned to a mobility management entity within the core network of an SAE/LTE communication system. In this case, the assignment is advantageously made automatically by the mobility management entity. Only at least one first identifier will be made available to the mobility management entity, to which a unique identifier will be assigned.

In the method, it is preferred if at least one first identifier is provided by a configuration database via a data connection. That is, the configuration database provides at least one first identifier via a data connection to a mobility management entity. The mobility management entity advantageously acquires at least one of the at least identifier one first identifier. The at least one first identifier is transmitted from the mobility management entity to the other mobility management entities via interfaces, particularly so-called S11 interfaces, in an interaction between the mobility management entity with other mobility management entities of the core network, and/or the other identifiers of the other mobility management entities are transmitted to the mobility management entity. In an evaluating step, the identifiers of all mobility management entities are compared with one another, and if it is established that the at least one first identifier that is provided is not assigned to any of the other mobility management entities, the mobility management entity assigns the at least one first identifier that is provided preferably to itself.

After constructing a data connection between the configuration database and the mobility management entity, which is produced particularly via a so-called S12 interface, the configuration database can make available at least one first identifier to the mobility management entity to which a unique identifier will be assigned. In this case, the configuration database can make available to the mobility management entity only a single first identifier, or, however, it can provide a plurality of first identifiers. In a next step, the mobility management entity acquires the first identifier or a first identifier from the plurality of first identifiers. The acquired unique identifier is subsequently transmitted from the mobility management entity to the other mobility management entities via interfaces, particularly so-called S11 interfaces, which preferably represent open interfaces, in an interaction between the mobility management entity with other mobility management entities of the core network, and/or the unique identifiers of the other mobility management entities are transmitted to the mobility management entity. In an evaluating step, the unique identifiers of all mobility management entities are compared with one another. If it is established that the acquired unique identifier is not assigned to any of the other mobility management entities, the mobility management entity assigns to itself the acquired unique identifier.

The configuration database is preferably part of the core network of the SAE/LTE communication system. The mobility management entity, to which a unique identifier will be assigned, is connected to the configuration database in such a way that data can be exchanged between the configuration database and the mobility management entity. This is particularly carried out via a so-called S12 interface.

According to a preferred enhancement of the invention, it can be provided in the method that the selection of other mobility management entities involves the direct neighbors of the mobility management entity. The selection can be limited to one or more groups of mobility management entities. In particular, the selection is limited to the direct neighbors of the mobility management entity, wherein the neighboring mobility management entities can be mobility management entities that will respond, for example, via the same regions of an access network, i.e., via the same base stations of an access network.

The comparison of the other identifiers of the other mobility management entities with the at least one first identifier can be conducted in the mobility management entity and/or in a mobility management entity from the selection of other mobility management entities. That is, either the mobility management entity to which a unique identifier will be assigned examines whether one of the other identifiers of the other mobility management entities coincides with the at least one first identifier that has been provided, or a mobility management entity of the other mobility management entities conducts this examination.

When the examination of the identifiers is conducted by another mobility management entity, if it is established that the at least one first identifier is not assigned to any other mobility management entity, the mobility management entity of the other mobility management entities that has conducted the examination can communicate this to the mobility management entity to which a unique identifier will be assigned, so that the latter can assign to itself the at least one first identifier. Alternatively, the mobility management entity that has conducted the examination can assign the at least one first identifier to the mobility management entity to which a unique identifier will be assigned.

According to an appropriate first enhancement of the invention, it can be provided by the method that in step b1) the mobility management entity transmits the provided at least one first identifier to the other mobility management entities of the core network together with a query of whether the acquired unique identifier is assigned to these units, and that in step c1), based on the response messages from the other mobility management entities, the mobility management entity examines whether the identifiers coincide. That is, the mobility management entity transmits the at least one first identifier that has been provided to the other mobility management entities of the core network via interfaces, particularly so-called S11 interfaces, which preferably represent open interfaces. Further, the mobility management entity transmits a query to the other mobility management entities, in which it queries whether the at least one first identifier is already assigned to these units. Subsequently, the mobility management entity examines whether response messages from the other mobility management entities are present indicating coincidences with the at least one first identifier. If response messages are present, then the mobility management entity examines whether or not the at least one first identifier is assigned to the other mobility management entities that have responded. If there are no response messages, in particular, after the end of a specific time span, then the mobility management entity interprets this as meaning that the at least one first identifier is not assigned to the other mobility management entities.

It is not absolutely necessary that a response message is sent from the other mobility management entities to which the mobility management entity to which a unique identifier will be assigned has sent an query of whether the at least one first identifier is assigned. Therefore, it may also be provided that the other mobility management entities do not send a response message to the inquiring mobility management entity as long as the at least one first identifier is not assigned to them. The querying mobility management entity may interpret the lack of response messages as the [fact that] the at least one first identifier is not assigned to the other mobility management entities.

It is advantageous, however, if, after receiving the at least one first identifier transmitted by the mobility management entity and the query of the mobility management entity of whether the at least one first identifier is already assigned to them, the other mobility management entities each transmit a response message to the mobility management entity, in which the mobility management entities indicate whether or not the at least one first identifier transmitted by the mobility management entity is assigned to them. This is particularly advantageous if it turns out that the at least one first identifier is already assigned to another mobility management entity. By means of feedback messages from the other mobility management entities, the mobility management entity to which a unique identifier will be assigned communicates to the configuration database that the at least one first identifier that is provided is already assigned. The configuration database can delete this first identifier from its selection of unique identifiers and provide another first identifier to the mobility management entity. That is, therefore, a method is advantageous in which, when determining that the at least one first identifier is already assigned to one of the other mobility management entities, the mobility management entity additionally communicates this to the configuration database, particularly in the form of a message, and the configuration database provides another first identifier to the mobility management entity. Steps b1) to d1) according to claim 1 are then repeated corresponding to other first identifiers until it is determined that a first identifier is not yet assigned to any other mobility management entity.

Whereas, in the method according to the first enhancement of the invention, after receiving the at least one first identifier, the mobility management entity transmits the at least one first identifier that is provided via interfaces to other mobility management entities of the core network and, in a query to the other mobility management entities, queries whether the at least one first identifier is already assigned to these units, according to an appropriate second enhancement of the invention, it can be provided in the method that in step b1), the mobility management entity asks the other mobility management entities in a query which other identifiers are assigned to these mobility management entities. That is, in the method according to the second enhancement of the invention, the mobility management entity does not communicate to the other mobility management entities which at least one first identifier has been provided to it. The mobility management entity only transmits a query in which it asks about the other identifiers of the other mobility management entities. Subsequently, on the basis of the feedback replies from the other mobility management entities, the mobility management entity examines whether or not the at least one first identifier provided to it is available.

If it is established that the at least one first identifier is not assigned to any other mobility management entity, the mobility management entity assigns to itself the at least one first identifier. Otherwise, the mobility management entity communicates to the configuration database that the at least one first identifier is already assigned to another mobility management entity. The configuration database then provides another first identifier to the mobility management entity, and the method is repeated. The advantage in this method is also that the mobility management entity takes over the examination of whether one of the other mobility management entities is characterized by the at least one first identifier that has been acquired by the mobility management entity. The configuration database only needs to provide one or more first identifiers to the mobility management entity. This provision can be conducted automatically by the configuration database without the necessity of human interaction.

As has already been indicated, according to a particularly appropriate enhancement of the invention, it can be provided in the method that the configuration database provides a plurality of first identifiers, i.e., a selection of first identifiers, to the mobility management entity, and that the mobility management entity stores this selection of first identifiers, and that the mobility management entity acquires an identifier from the selection of first identifiers, and steps b1) to d1) are repeated according to claim 1. Thus, for example, the mobility management entity can transmit the first identifier that has been provided to the other mobility management entities of the core network via the S11 interfaces to other mobility management entities and likewise can transmit a query to the other mobility management entities, in which it queries whether this first identifier is already assigned to these units.

That is, the configuration database makes available at one time a selection of a plurality of first identifiers to the mobility management entity to which a unique identifier will be assigned. Selection of first identifiers in the sense of the invention means that the configuration database provides a plurality of first identifiers to the mobility management entity. A range of first identifiers, for example, a range of A-Z or 1-100 can serve as the selection of first identifiers. After the assignment of a first identifier, a mobility management entity is characterized as unique within the core network. A mobility management entity therefore usually always retains this unique identifier. The first identifiers may involve, for example, a numbering of the mobility management entities, whereby each mobility management entity receives a different numbering.

The mobility management entity stores the provided selection of unique identifiers in a memory unit assigned to it.

The mobility management entity acquires a first identifier from the provided selection of first identifiers. It does not matter which first identifier the mobility management entity acquires or chooses from the selection of first identifiers. Subsequently, the acquired first identifier is transmitted from the mobility management entity to the other mobility management entities and/or the other identifiers of the other mobility management entities are transmitted to the mobility management entity via interfaces, particularly S11 interfaces, in an interaction between the mobility management entity and the other mobility management entities of the core network.

Thus, the mobility management entity can transmit the first identifier provided to it or acquired by it to the other mobility management entities of the core network via the corresponding interfaces, particularly via the so-called open S11 interfaces. Further, the mobility management entity can transmit a query to the other mobility management entities, in which it queries whether the acquired first identifier is already assigned to one of the other mobility management entities.

In a subsequent evaluating step, the first identifiers of all mobility management entities are compared with one another. Thus, in the subsequent evaluating step, the mobility management entity can examine whether response messages are present from the other mobility management entities with respect to correspondences of the first identifier or whether the first identifier is already assigned to another mobility management entity. If it is established that the acquired first identifier is not assigned to any other mobility management entity, the mobility management entity automatically assigns to itself the first unique identifier.

According to a particularly appropriate enhancement of the invention, it can be provided in the method that if it is established that the provided first identifier is assigned to one of the other mobility management entities, the mobility management entity to which a unique identifier will be assigned acquires another first identifier from the stored selection of first identifiers and steps b1) to d1) according to claim 1 are repeated. Thus, the mobility management entity can transmit the other acquired first identifier to the other mobility management entities of the core network via the interfaces and likewise transmit a query to the other mobility management entities in which it queries whether the other acquired first identifier is assigned to these units, and subsequently steps c1) and d1) according to claim 1 can be repeated.

That is, if it is established that the acquired first identifier is already assigned to one of the other mobility management entities, the mobility management entity can select another first identifier from the selection of first identifiers and again inquire of the other mobility management entities whether the other first identifier is assigned to one of these other mobility management entities. If this is the case, the mobility management entity deletes the acquired first identifier from the selection of first identifiers and selects another first identifier from the now reduced selection of first identifiers. By storing the selection of first identifiers in a memory unit assigned to the mobility management entity, an interaction with the configuration database of the core network is not necessary. The mobility management entity selects another first identifier from the selection of first identifiers until it is established that one of the selected first identifiers is not as yet assigned to another mobility management entity. In this way, the mobility management entity accesses the selection of first identifiers stored in its memory unit.

Advantageously, the configuration database of the mobility management entity to which a unique identifier will be assigned also can provide at one time a selection of a plurality of first identifiers, i.e., a pool of first identifiers, in the method according to the second enhancement of the invention.

The mobility management entity stores the provided selection of first identifiers in a memory unit assigned to it. The mobility management entity acquires any first identifier from the provided selection of first identifiers. Subsequently, the mobility management entity transmits a query to the other mobility management entities within the core network, asking about the identifiers of the other mobility management entities.

In a subsequent evaluating step, based on the response messages of the other mobility management entities, the mobility management entity examines whether the selected first identifier is already assigned to another mobility management entity. If it is established that the acquired first identifier is not assigned to any other mobility management entity, the mobility management entity automatically assigns to itself the acquired first identifier.

An advantage of such a method is that in assigning a unique identifier to a mobility management entity already implemented in the core network, or in implementing a mobility management entity into the core network, the configuration database and thus an operator of the configuration database no longer must intervene. The configuration database provides a selection of first identifiers to the mobility management entity only at the beginning. After this, the mobility management entity automatically acquires or selects any first identifier from the selection of first identifiers and independently examines whether this selected first identifier already uniquely characterizes another mobility management entity within the core network. After establishing that a selected first identifier is still not assigned, the mobility management entity automatically assigns to itself the selected first identifier. The occurrence of errors in assigning unique identifiers to a mobility management entity can be prevented or can be clearly reduced by such a method. In particular, in the planning phase of a core network of an SAE/LTE communication system, such a method is advantageous, since the assignment of unique identifiers to one or a plurality of mobility management entity (entities) is produced for the most part by the mobility management entity (entities) itself (themselves). It is assured that, due to the interaction with other mobility management entities, there are no double assignments when assigning unique identifiers to the mobility management entities.

A method is preferred in which the mobility management entity stores the response messages of other mobility management entities and if it is established that the acquired first identifier is assigned to one of the other mobility management entities, the mobility management entity acquires another first identifier from the stored selection of first identifiers, and based on the stored response messages of the other mobility management entities, examines whether the other first identifier is assigned to another mobility management entity.

That is, if it is established that the acquired first identifier is already assigned to one of the other mobility management entities, the mobility management entity selects another first identifier from the stored selection of first identifiers. Since the mobility management entity already knows the identifiers of the other mobility management entities, the mobility management entity examines whether the other selected first identifier is already assigned. If this is the case, the mobility management entity selects another first identifier from the stored selection until it establishes that this one is not as yet assigned to another mobility management entity.

The particular advantage of this method lies in the fact that very little data traffic is necessary between the configuration database and the mobility management entity as well as between the mobility management entity and the other mobility management entities. The configuration database makes available at one time a selection of first identifiers to the mobility management entity to which a unique identifier will be assigned. That is, the configuration database transmits a list of different first identifiers to the mobility management entity. The mobility management entity stores the selection of first identifiers in its memory unit. After storing the selection of first identifiers, the mobility management entity operates completely self-sufficiently. That is, the mobility management entity selects from the selection of first identifiers one first identifier and queries the other mobility management entities about their identifiers. Based on the feedback responses of the other mobility management entities, the mobility management entity can establish whether the acquired or selected first identifier is still available or whether it has already been assigned to another mobility management entity. If the selected first identifier has already been assigned, the mobility management entity selects another first identifier from the stored selection of first identifiers and compares this again with the identifiers of the other mobility management entities. After selecting another first identifier, it is no longer necessary to transmit a query to the other mobility management entities, since the feedback responses of the mobility management entity are already present. For comparison purposes, these are advantageously stored in the memory unit of the mobility management entity.

It is preferred if, after the assignment of the provided first identifier, the mobility management entity communicates to the configuration database which first identifier is assigned to it. The database can delete the unique identifier assigned to the mobility management entity from its list, so that it does not provide this identifier to another mobility management entity to which a unique identifier will be assigned. That is, if the configuration database provides a selection of first identifiers to another mobility management entity, it no longer provides to it for selection the first identifier assigned to the previous mobility management entity. Unnecessary increased expense can be avoided in this way.

According to another appropriate enhancement of the invention, it can be provided in one of the methods that the configuration database provides to the mobility management entity a globally unique mobility management entity identifier number as at least one first identifier or a plurality of globally unique mobility management entity identifier numbers as a selection of first identifiers. A globally unique mobility management entity identifier number is particularly well suitable in order to unmistakably characterize mobility management entities within a core network of an SAE/LTE communication system. The globally unique mobility management entity identifier number, which is abbreviated as GUMMEI, can be composed of different individual identifiers.

Thus, the globally unique mobility management entity identifier number (GUMMEI) can be advantageously composed of a public land-based mobile network identifier, the so-called PLMN-ID and of a mobility management entity identifier, the so-called MMEI. The PLMN-ID (PLMN-ID=Public Land Mobile Network Identifier) in turn comprises a country code, the so-called (MCC=Mobile Country Code), as well as an identifier of a network provider, the so-called MNC (MNC=Mobile Network Code). The mobility management entity identifier (MMEI) can advantageously have a mobility management entity group identifier (MME Group ID) as well as a mobility management entity code (MME Code). The MME Group ID (MME Group ID=mobility management entity group identifier) denotes that an MME belongs to a specified group within the core network of the SAE/LTE communication system. For example, the MME Group ID can characterize all MMEs of a specific town or a specific localion within a town. The MME Code (MME Code=mobility management entity code) gives the numbering of an MME within such a specific group.

Thus, the globally unique mobility management entity identifier number (GUMMEI) indicates that a specific mobility management entity is part of the Vodafone core network in Germany. Further, the GUMMEI can indicate that the specific mobility management entity belongs to the group of all mobility management entities in Düsseldorf and has therein the code 23.

However, other identifiers can also serve for the unique characterization of a mobility management entity.

The configuration database is preferably part of an operations and maintenance unit on a computer unit. The operations and maintenance unit is frequently also designated as the Operations & Maintenance unit. The configuration database preferably can be a part of the core network of the SAE/LTE communication system. The mobility management entity, to which a unique identifier will be assigned, is connected to the configuration database in such a way that data can be exchanged between the configuration database and the mobility management entity, particularly via so-called S12 interfaces.

According to the second aspect of the invention, the object is achieved by a method for implementing a mobility management entity in a core network of an SAE/LTE communication system, wherein this method is characterized by the following steps:

f) A new mobility management entity is added to the core network and connected via interfaces to other mobility management entities of the core network;

g) A unique identifier is assigned to the newly added mobility management entity by means of a method according to the first aspect of the invention.

Such a method makes possible an approximately automatic implementation of a mobility management entity in a core network of an SAE/LTE communication system. After connecting the newly added mobility management entity to the other mobility management entities already Implemented in the core network, a unique identifier is assigned to the newly added mobility management entity. This is carried out by the method for assigning unique identifiers to a mobility management entity in a core network of an SAE/LTE communication system according to the first aspect of the invention. The necessary work by an installer is reduced to a minimum by such a method. The installer connects the newly added mobility management entity to the mobility management entities already implemented in the core network via corresponding interfaces, particularly so-called open S11 interfaces. Subsequently, the network operator ensures that the configuration database provides at least one first identifier, in particular, a selection of first identifiers to the newly added mobility management entity.

According to a third aspect of the invention, the object is achieved by a mobility management entity of a core network of an SAE/LTE communication system, with at least one interface, particularly at least one S11 interface, to other mobility management entities of the core network, and with an interface, particularly an S12 interface, to a configuration database for constructing a connection and for transmitting data to the configuration database, in which the mobility management entity has means for conducting a method according to the first or second aspect of the invention.

Advantageously, a receiver is provided to the mobility management entity for receiving at least one first identifier or a selection of first identifiers, which are provided by the configuration database, for example. Further, an acquisition device is preferably provided in order to acquire at least one first identifier, and a transmitting and receiving device is provided for transmitting the acquired at least one first identifier and/or for transmitting queries to other mobility management entities of the core network and for receiving identifiers and/or response messages from other mobility management entities via interfaces. In addition, the mobility management entity advantageously has an evaluating device for comparing the identifiers of all mobility management entities. The evaluating device serves, for example, for examining whether response messages are present from other mobility management entities with respect to correspondences of the acquired at least one first identifier. Further, means are advantageously provided for assigning the provided or acquired identifier.

The mobility management entity preferably has means for conducting a method according to the first, the second or the third aspect of the invention.

The mobility management entity can be connected physically to the other mobility management entities of the core network via interfaces, particularly an open S11 interface. The mobility management entities can exchange data bidirectionally with one another via these interfaces. Further, the mobility management entity can be connected to the configuration database via another interface, particularly an S12 interface. This additional interface serves for constructing a connection to a configuration database, particularly of the core network, and for transmitting data to the configuration database. The mobility management entity can receive at least one unique identifier or a selection of unique identifiers, which are provided by the configuration database, via the receiver. The acquisition device serves for acquiring a first identifier or for selecting a first identifier from a selection of first identifiers. After acquiring a first identifier, the mobility management entity can communicate with the other mobility management entities of the core network via a transmitting and receiving device that is assigned to it. The evaluating device serves for examining whether response messages are present from the other mobility management entities with respect to correspondences of the acquired first identifier and whether the acquired first identifier is assigned to another mobility management entity. Further, the mobility management entity has means for assigning the acquired first identifier. That is, after establishing that the first identifier acquired by it is not assigned to another mobility management entity, the mobility management entity can assign to itself the first, i.e., unique identifier.

Such a mobility management entity can be implemented in a very flexible manner, since it is able to examine by itself whether it can or cannot be assigned a unique identifier that has been provided. In this way, in particular, a unique, unmistakable identifier can be assigned to the mobility management entity that is added, for example, to a core network of an SAE/LTE communication system. Finally, the identifier is read as secondary as long as it uniquely characterizes only one mobility management entity.

For conducting the method, the mobility management entity preferably comprises a memory unit for storing the selection of identifiers that has been made available.

BRIEF DESCRIPTION OF THE DRAWINGS

The invention and its enhancements as well as the advantages thereof will be explained in more detail below based on the drawings. Here, schematically.

Figure 1:
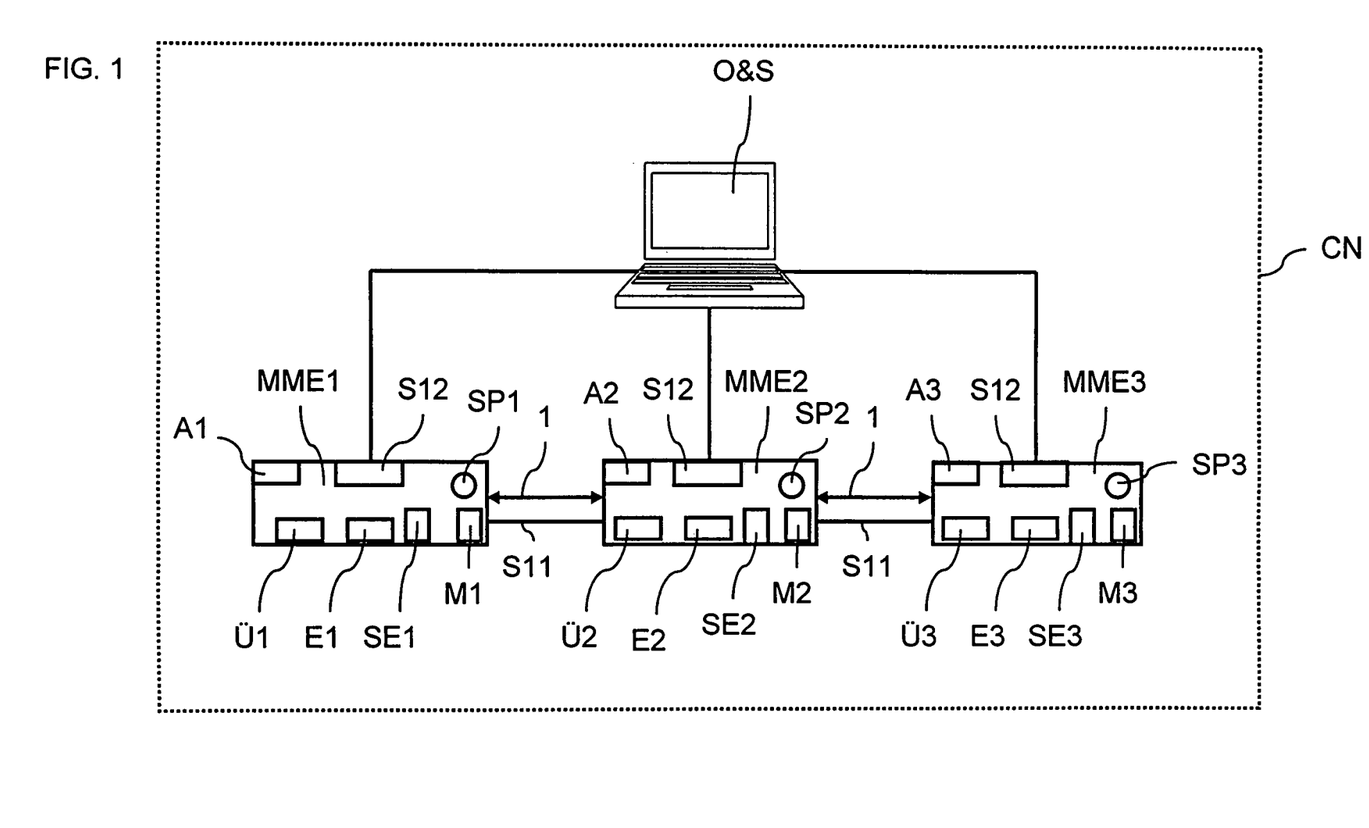
FIG. 1 shows a part of a core network of an SAE/LTE communication system, with a configuration database and three mobility management entities according to the invention.
Figure 2:
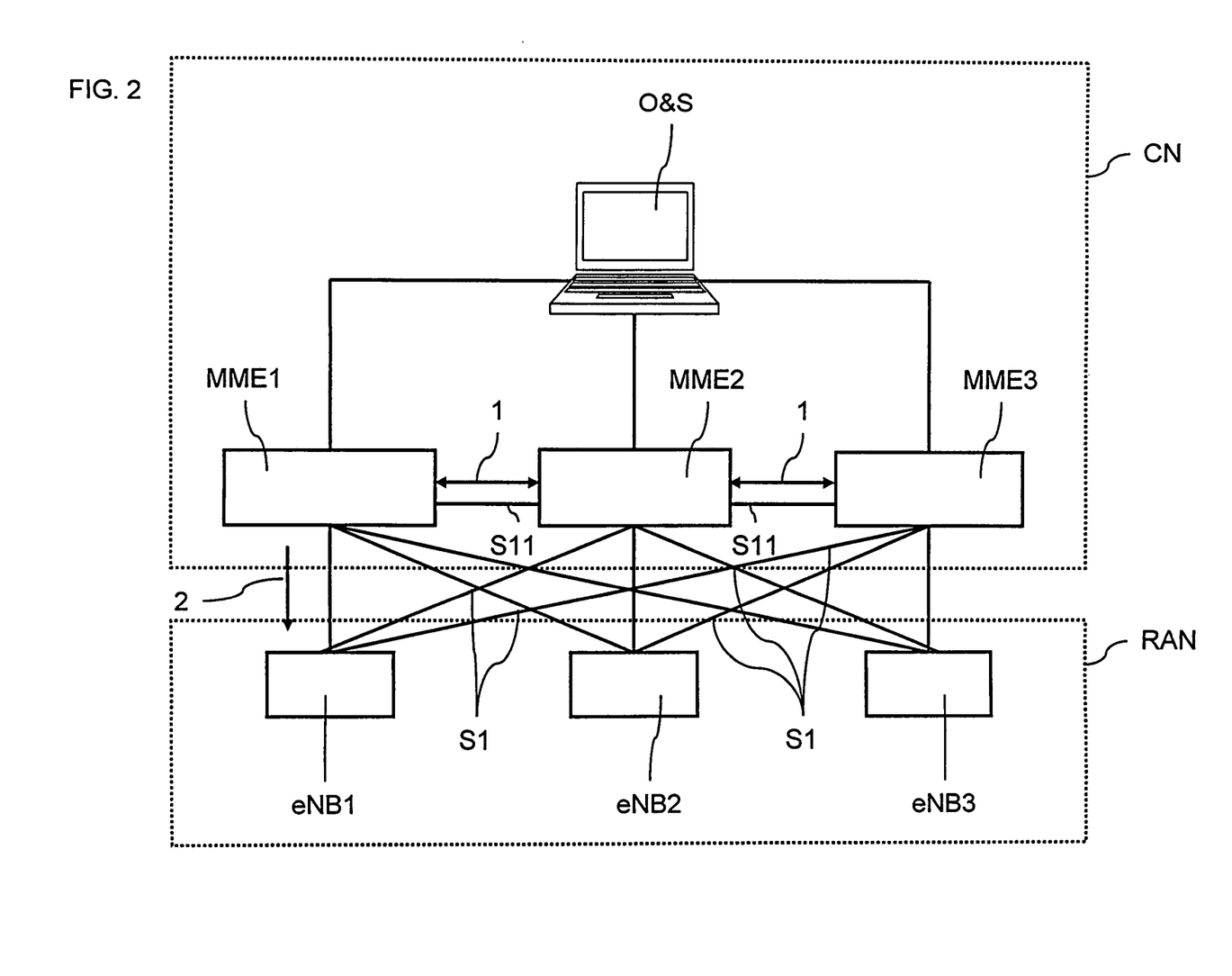
FIG. 2 shows a part of a core network of an SAE/LTE communication system, with a configuration database and three mobility management entities according to the invention, as well as three base stations of an access network that are connected to the mobility management entities.

Elements with the same function and operation are provided with the same reference numbers in FIGS. 1 and 2.

DETAILED DESCRIPTION OF THE INVENTION

Advantageous examples of mobility management entities MME1, MME2, MME3 according to the invention are shown in FIGS. 1 and 2.

FIG. 1 shows schematically a part of a core network CN of an SAE/LTE communication system, with a configuration database O&S and three mobility management entities MME1, MME2, MME3 according to the invention. The mobility management entities are connected to one another via so-called open S11 interfaces, so that each mobility management entity can communicate with all other mobility management entities. Data can be exchanged via open S11 interfaces, which is indicated by the reference number 1.

In addition to the S11 interfaces, the mobility management entities MME1, MME2, MME3 each have an interface S12 to a configuration database O&S. The S12 interfaces serve for constructing a connection to the configuration database O&S and for transmitting data to and from the configuration database O&S. Each mobility management entity MME1, MME2, MME3 further has a receiver E1, E2, E3 for receiving at least one first identifier or a selection of first identifiers that are provided by the configuration database O&S.

The acquisition device Ü1, Ü2, Ü3 serves for acquiring or for selecting a first identifier. Each mobility management entity MME1, MME2, MME3 further has a transmitting and receiving device SE1, SE2, SE3 for transmitting the provided at least one first identifier and/or a query to other mobility management entities MME1, MME2, MME3 of the core network CN via the interfaces S11. The evaluating devices A1, A2, A3 serve for examining whether response messages are present from other mobility management entities MME1, MME2, MME3 with respect to correspondences of the acquired at least one first identifier, and/or for examining whether the acquired first identifier is assigned to another mobility management entity MME1, MME2, MME3 based on the response messages transmitted from the other mobility management entities MME1, MME2, MME3. In addition, each mobility management entity MME1, MME2, MME3 has means M1, M2, M3 for assigning the acquired identifier. This means M1, M2, M3 makes it possible for each mobility management entity MME1, MME2, MME3 to assign to itself the initially acquired first identifier after an examining process, so that each mobility management entity MME1, MME2, MME3 has a unique, unmistakable identifier, by means of which it can be controlled within an SAE/LTE communication system.

In addition, each mobility management entity MME1, MME2, MME3 advantageously has a memory unit SP1, SP2, SP3. The mobility management entity MME1, MME2, MME3 stores the selection of first identifiers provided to it in the memory unit SP1, SP2, SP3. Further, the memory unit SP1, SP2, SP3 can store the feedback responses or response messages of each of the other mobility management entities MME1, MME2, MME3. By storing this data, a mobility management entity MME1, MME2, MME3 can very simply and independently assign a unique identifier that does not characterize any other mobility management entity MME1, MME2, MME3.

FIG. 2 shows schematically a part of a core network CN of an SAE/LTE communication system, with a configuration database O&S and three mobility management entities MME1, MME2, MME3 according to the invention, as well as three base stations eNB1, eNB2, eNB3 of an access network RAN. The base stations eNB1, eNB2, eNB3 are connected to the mobility management entities MME1, MME2, MME3 via interfaces S1, particularly via so-called S1-flex interfaces. In this way, each base station eNB1, eNB2, eNB3 is connected to each of the mobility management entities MME1, MME2, MME3. The arrow, which is characterized by reference number 2 indicates that the unique identifier assigned to each one of mobility management entities MME1, MME2, MME3 is transmitted to each base station eNB1, eNB2, eNB3, so that the base stations eNB1, eNB2, eNB3 can identify and control the respective mobility management entities MME1, MME2, MME3.

LIST OF REFERENCE SYMBOLS

1 Data exchange between the MMEs
2 Data exchange between the MMEs and the eNBs
O&S Configuration database
S1 Flex interfaces between the MMEs and the eNBs
S11 Interfaces between the MMEs
S12 Interface of an MME to the O&S
A1, A2, A3 Evaluating devices
Ü1, Ü2, Ü3 Acquisition devices
E1, E2, E3 Receivers
SE1, SE2, SE3 Transmitting and receiving devices
M1, M2, M3 Means for assigning identifiers
SP1, SP2, SP3 Memory units
MME1, MME2, MME3 Mobility management entities
eNB1, eNB2, eNB3 Base stations of the access network
CN Core network
RAN Access network
SAE/LTE System Architecture Evolution/Long Term Evolution

The invention claimed is:

1. A method for assigning a unique identifier to a mobility management entity in a core network of a System Architecture Evolution/Long Term Evolution communication system that is characterized by the following steps:
   a1) providing at least one first identifier to a mobility management entity,
   b1) transmitting the at least one first identifier which has been received by the mobility management entity from the mobility management entity to a selection of other mobility management entities and/or transmitting of identifiers which are assigned to a selection of other mobility management entities to the mobility management entity,
   c1) comparing the other identifiers of the selection of the other mobility management entities with the at least one first identifier of the mobility management entity in order to establish the uniqueness of the at least one first identifier,
   d1) assigning the at least one first identifier to the mobility management entity once the uniqueness of the at least one first identifier is established.

2. The method according to claim 1, further characterized in that the at least one first identifier is provided by a configuration database via a data connection.

3. The method according to claim 1, further characterized in that the at least one first identifier and/or the other identifiers are transmitted via interfaces.

4. The method according to claim 1, further characterized in that the selection of other mobility management entities involves the direct neighbors of mobility management entity.

5. The method according to claim 1, further characterized in that the comparison of other identifiers with the at least one first identifier is conducted in the mobility management entity and/or in a mobility management entity from the selection of other mobility management entities.

6. The method according to claim 5, further characterized in that in step b1) the mobility management entity transmits the provided at least one first identifier to the other mobility management entities of the core network together with the query of whether the at least one identifier is assigned to these units, and that in step c1), based on the response messages from the other mobility management entities, the mobility management entity examines whether the identifiers coincide.

7. The method according to claim 2, further characterized in that once a determination is made that the at least one identifier that is provided is assigned to one of the other mobility management entities, the mobility management entity communicates this to the configuration database and the configuration database provides an at least one other first identifier to the mobility management entity, and that steps b1) to d1) are repeated.

8. The method according to claim 2, further characterized in that in step a1), the configuration database provides a selection of first identifiers to the mobility management entity, that the mobility management entity stores this selection of first identifiers, that the mobility management entity acquires a first identifier from the selection of first identifiers, and that steps b1) to d1) are repeated.

9. The method according to claim 8, further characterized in that, once a determination is made that the first identifier that is provided is assigned to one of the other mobility management entities, the mobility management entity acquires another first identifier from the stored selection of first identifiers, and that steps b1) to d1) are repeated.

10. The method according to claim 6, further characterized in that the mobility management entity stores the response messages of the other mobility management entities and that once a determination is made that the at least one first identifier that is provided is assigned to one of the other mobility management entities, the mobility management entity acquires another first identifier from the stored selection of first identifiers, and based on the stored response messages of the other mobility management entities, examines whether the other first identifier is assigned to another mobility management entity.

11. The method according to claim 2, further characterized in that after the assignment of the acquired first identifier, the mobility management entity communicates to the configuration database which first identifier is assigned to the mobility management entity.

12. The method according to claim 2, further characterized in that the configuration database provides to the mobility management entity a globally unique mobility management entity identifier number as at least one first identifier or a plurality of globally unique mobility management entity identifier numbers as a selection of identifiers.

13. The method according to claim 12, further characterized in that a globally unique mobility management entity identifier number comprises the following components:
a public land-based mobile network identifier, which has a country code as well as an identifier of a network operator,
and a mobility management entity identifier, which has a mobility management entity group identifier as well as a mobility management entity code.

14. The method according to claim 2, further characterized in that the configuration database is part of an operations and maintenance unit on a computer unit.

15. The method according to claim 2, further characterized in that the data connection is provided between the configuration database and the mobility management entity via interfaces.

16. A method for implementing a mobility management entity in a core network of a System Architecture Evolution/Long Term Evolution communication system that is characterized by the following steps:

f) a new mobility management entity is added to the core network and connected to other mobility management entities of the core network via interfaces;
g) a unique identifier is assigned to the newly added mobility management entity by means of a method according to claim 1.

17. A mobility management entity of a core network of a System Architecture Evolution/Long Term Evolution communication system, with at least one interface to other mobility management entities of the core network and with an interface to a configuration database which is adapted to construct a connection and to transmit data to the configuration database, is hereby characterized in that the mobility management entity has means for conducting a method according to one claim 1.

18. The mobility management entity according to claim 17, further characterized in that a receiver is provided which is adapted to receive at least one first identifier or a selection of first identifiers, which are provided by the configuration database, that an acquisition device is provided which is adapted to acquire a first identifier, that a transmitting and receiving device is provided which is adapted to transmit the acquired first identifier and/or to transmit queries to other mobility management entities of the core network and to receive other identifiers and/or response messages from other mobility management entities via interfaces, that an evaluating device is provided which is adapted to compare the identifiers of all mobility management entities and that means are provided which are adapted to assign the acquired first identifier.

19. The mobility management entity according to claim 17, further characterized in that the mobility management entity comprises a memory unit which is adapted to store the selection of first identifiers that is provided and/or the response messages of the mobility management entities.

* * * * *